United States Patent
Yokouchi et al.

(10) Patent No.: US 8,398,806 B2
(45) Date of Patent: Mar. 19, 2013

(54) METHOD FOR MANUFACTURING JOINED SHEET MATERIAL, JOINED SHEET MATERIAL AND METHOD FOR MANUFACTURING OPTICAL DISPLAY UNIT

(75) Inventors: Tadashi Yokouchi, Ibaraki (JP); Takaichi Amano, Ibaraki (JP); Tomokazu Yura, Ibaraki (JP); Kazuo Kitada, Ibaraki (JP)

(73) Assignee: Nitto Denko Corporation, Obaraki-shi, Osaka (JP)

( * ) Notice: Subject to any disclaimer, the term of this patent is extended or adjusted under 35 U.S.C. 154(b) by 233 days.

(21) Appl. No.: 12/682,151

(22) PCT Filed: Nov. 18, 2008

(86) PCT No.: PCT/JP2008/070954
§ 371 (c)(1),
(2), (4) Date: Apr. 8, 2010

(87) PCT Pub. No.: WO2009/066668
PCT Pub. Date: May 28, 2009

(65) Prior Publication Data
US 2010/0227104 A1    Sep. 9, 2010

(30) Foreign Application Priority Data

Nov. 20, 2007 (JP) ................................. 2007-300639
Nov. 12, 2008 (JP) ................................. 2008-290255

(51) Int. Cl.
B29C 65/00 (2006.01)
B32B 37/00 (2006.01)
B32B 38/04 (2006.01)

(52) U.S. Cl. ........ 156/257; 156/268; 156/238; 156/239; 156/264; 156/304.3; 156/505

(58) Field of Classification Search ............... 156/238, 156/239, 257, 268, 264, 304.3, 505
See application file for complete search history.

(56) References Cited

U.S. PATENT DOCUMENTS 3,554,842 A * 1/1971 Byrt .............................. 156/505
7,022,204 B2 * 4/2006 Kanbara et al. ............... 156/257
(Continued)

FOREIGN PATENT DOCUMENTS

| JP | 2005-060488 A | 3/2005 |
| JP | 2006-163377 A | 6/2006 |

(Continued)

OTHER PUBLICATIONS

International Search Report of PCT/JP2008/070954, mailing date of Feb. 10, 2009.

(Continued)

*Primary Examiner* — Linda L Gray
(74) *Attorney, Agent, or Firm* — Westermann, Hattori, Daniels & Adrian, LLP

(57) ABSTRACT

The invention is to provide a method for manufacturing a joined sheet product. The method comprising a first joining step including opposing a transverse end face of a first sheet product(1) to a transverse end face of a second sheet product (2) and joining release films of the first and second sheet products with a first joining member(30); a removing step including removing a portion of an intended member including at least a surface protecting member so as to leave at least the release film and a pressure-sensitive adhesive provided on the release film among the constituent members of both or any one of the first and second sheet products(1, 2), wherein the portion has a predetermined length from the transverse end face of the intended member; and a second joining step including providing a second joining member(40) on at least an exposed portion(40*b*) resulting from the removal of the intended member to join the surface protecting member sides of the first and second sheet products(1, 2).

2 Claims, 11 Drawing Sheets

U.S. PATENT DOCUMENTS

| | | | |
|---|---|---|---|
| 2007/0296890 A1 | 12/2007 | Mizushima et al. | |
| 2009/0135345 A1 | 5/2009 | Yajima et al. | |
| 2009/0159175 A1 | 6/2009 | Nakahira et al. | |
| 2009/0186170 A1 | 7/2009 | Yamamoto et al. | |

FOREIGN PATENT DOCUMENTS

| | | | |
|---|---|---|---|
| JP | 2007-140046 A | 6/2007 | |
| JP | 2007-328328 A | 12/2007 | |
| TW | 200300849 A | 6/2003 | |
| TW | 200740587 A | 11/2007 | |
| WO | 03/046620 A2 | 6/2003 | |

OTHER PUBLICATIONS

Korean Office Action dated Feb. 2, 2012, issued in corresponding Korean Patent Application No. 10-2010-7011031.

Taiwanese Office Action dated Apr. 10, 2012, issued in corresponding Taiwanese Patent Application No. 097144569, with English translation (7 pages).

Notification of Transmittal of Translation of the International Premliminary Report on Patentability ( Forms PCT/IB/338) of International Application No. PCT/JP2008/070954 mailed Jun. 17, 2010 with Form PCT/IB/373 and PCT/ISA/237.

* cited by examiner (a) Conventional Method for Joining (1)

(b) Conventional Method for Joining (2)

METHOD FOR MANUFACTURING JOINED SHEET MATERIAL, JOINED SHEET MATERIAL AND METHOD FOR MANUFACTURING OPTICAL DISPLAY UNIT

TECHNICAL FIELD

The invention relates to a method for manufacturing a joined sheet product by joining the end faces of sheet products to each other, and to a joined sheet product in which the end faces of sheet products are joined to each other. The invention also relates to a method for manufacturing an optical display unit, in which the joined sheet product manufactured by the above method or a joined sheet product is used to place an optical member on a substrate.

BACKGROUND ART

A description is given below of a manufacturing method including bonding an optical film to an optical display unit (such as a glass substrate unit in which a liquid crystal is sealed). First, a material roll of a long sheet product including an optical film member is manufactured. For example, the "long sheet product" includes a raw material for a polarizing plate for use in a liquid crystal display. For example, a roll of a raw material for a polarizing plate is manufactured by the process described below. The upstream process includes (A) the step of obtaining a polarizer; (B) the step of manufacturing a polarizing plate, which includes placing a polarizer protecting film on one or both sides of the polarizer with an adhesive interposed therebetween and drying the laminate to give a polarizing plate; and (C) the step of bonding a release film (also called "separator") and a surface protecting film. In the upstream process, a long sheet product is manufactured, wound into a roll and subjected to the downstream process.

(D) The step of slitting the material roll is then performed, in which since the material roll is wide, the material is slit into a predetermined size depending on the size of an optical display unit (the final product). As mentioned above, the long sheet product is manufactured in the form of a material roll. When the predetermined length is not reached (for example, when the long sheet is partially cut due to a continuous defective state), two or more material rolls are joined to form a single material roll in some cases. Conventional examples of the joining method include the methods shown in FIG. 10, such as methods including layering an end portion of a sheet product 701 and an end portion of another sheet product 702 and bonding them by fusion or with an adhesive tape.

The process may also include continuously feeding the sheet product from the material roll, peeling off only the separator, and automatically inspecting any defect in the polarizing plate. In this case, if the process is stopped for every material roll, the work efficiency will be reduced. Therefore, it is proposed that an end portion of the sheet product being inspected should be joined to an end portion of the next sheet product. However, when the end portions are layered and joined as mentioned above, it is impossible to peel off only the separator.

Alternatively, as shown in FIG. 11, end portions may be joined with an adhesive tape 703 without overlapping. In this case, however, delamination sometimes starts from the pressure-sensitive adhesive on the surface protecting film side, and it is difficult to peel off only the separator with a probability of 100%.

Next, a description is given of the step of bonding an optical member-containing sheet product to a substrate as a component of an optical display unit. For example, Patent Literature 1 (Japanese Patent Application Laid-Open (JP-A) No. 2007-140046) discloses a process including unwinding and feeding a belt-shaped sheet product from a roll of the sheet product, detecting any defect in the sheet product, cutting the sheet product into individual pieces based on the result of the detection, and bonding each cut piece to a substrate, wherein in the bonding, only the separator is peeled off from the sheet product, and then the sheet product is bonded to the substrate with the remaining pressure-sensitive adhesive interposed therebetween.

Alternatively, another proposed method includes cutting members other than the separator, while keeping the separator continuous, and bonding the sheet product to a substrate with the remaining pressure-sensitive adhesive interposed therebetween, while peeling off only the separator. In order to perform the bonding process continuously, the sheet product being supplied needs to be joined to the next sheet product as mentioned above. Also in this case, when end portions are joined without overlapping as mentioned above and shown in FIG. 11, delamination sometimes starts from the pressure-sensitive adhesive on the surface protecting film side. Such a case is not preferred because of low continuous productivity, and it has been demanded to properly peel off only the release film.

Patent Literature 1: Japanese Patent Application Laid-Open (JP-A) No. 2007-140046

DISCLOSURE OF INVENTION

Problems to be Solved by the Invention

The invention has been made in view of the above circumstances, and an object of the invention is to provide a method for manufacturing a joined sheet product, which makes it possible to join opposed end faces of two sheet products in such a manner that only the intended member can be peeled off from the joined sheet product; and to provide such a joined sheet product or a method for manufacturing an optical display unit using such a joined sheet product.

Means for Solving the Problems

The invention is directed to a method for manufacturing a joined sheet product including sheet products that are joined to each other and each include at least an optical member, a surface protecting member provided on one side of the optical member, and a release film provided on the other side of the optical member with a pressure-sensitive adhesive interposed therebetween. The method includes:

a first joining step including opposing a transverse end face of a first sheet product to a transverse end face of a second sheet product and joining release films of the first and second sheet products with a first joining member;

a removing step including removing a portion of an intended member including at least a surface protecting member so as to leave at least the release film and a pressure-sensitive adhesive provided on the release film among the constituent members of both or any one of the first and second sheet products, wherein the portion has a predetermined length from the transverse end face of the intended member; and a second joining step including providing a second joining member on at least an exposed portion resulting from the removal of the intended member to join the surface protecting member sides of the first and second sheet products.

The process is effective and advantageous as described below. The sheet product includes at least the optical member, the release film provided on one side of the optical member with the pressure-sensitive adhesive interposed therebetween, and the surface protecting member provided on the other side of the optical member.

The optical member may be typically, but not limited to, any of various optical films having a monolayer structure or a laminated structure. The thickness of the optical member may typically be from 5 μm to 500 μm, while it depends on the structure of the optical member. Examples of the optical films include a polarizing plate, a retardation plate, a brightness enhancement film, and a light diffusion plate. The optical member may include the optical film and any other film placed thereon. For example, such any other film may be a polarizer protecting film for protecting a polarizer, or the like. When the optical member has a laminated structure, the respective layers may typically be provided with an adhesive, a pressure-sensitive adhesive or the like interposed between them. A laminated film formed by a multilayer extrusion process may also be used to form the optical member. The optical member is preferably a polarizing plate or a laminated structure including a polarizing plate. For example, the polarizing plate may include a stretched and dyed polyvinyl alcohol film polarizer and a polarizer protecting film that is provided on at least one side of the polarizer with an adhesive interposed therebetween and typically includes a triacetylcellulose film.

For example, the pressure-sensitive adhesive may be a rubber-based pressure-sensitive adhesive, an acrylic pressure-sensitive adhesive, a silicone pressure-sensitive adhesive, an epoxy pressure-sensitive adhesive, or a cellulose pressure-sensitive adhesive. An acrylic pressure-sensitive adhesive with a high level of heat resistance or transparency is preferred. The pressure-sensitive adhesive preferably forms a layer, and the thickness of such a layer is typically from 1 to 50 μm.

An acrylic pressure-sensitive adhesive is generally obtained by polymerization of a main monomer for imparting adherability, a comonomer for imparting cohesiveness, and a functionality-containing monomer for imparting adherability and forming a crosslinking point. Such an acrylic pressure-sensitive adhesive preferably has a glass transition temperature of −60° C. to −10° C., a weight average molecular weight of 200,000 to 2,000,000, and a refractive index of 1.45 to 1.65. Under the conditions described above, a practically sufficient adhesive strength is obtained for long-term attachment to a liquid crystal cell. For example, an acrylic pressure-sensitive adhesive having the above properties may be produced by reference to Katsuhiko Nakano, "Secchaku/Nenchaku no Kagaku to Oyo (Chemistry and Applications of Adhesion/Pressure-Sensitive Adhesion)," published in Japanese by Dainippon tosho Co., Ltd.

The material and the thickness of the release film are not restricted, and any of various films may be used as the release film. For example, the release film may be a polyethylene terephthalate (PET) film, a polyethylene (PE) film, a polypropylene (PP) film, or the like. For example, the thickness of such a film may be in the range of 12 μm to 80 μm.

For example, the surface protecting member may be provided on the optical member with a pressure-sensitive adhesive interposed therebetween or provided directly on the optical member with no pressure-sensitive adhesive interposed therebetween. For example, a method of providing the surface protecting member directly on the optical member may be a method of producing the surface protecting member and the optical member in the form of a laminated film by a multilayer extrusion process. The surface protecting member is preferably in the form of a film. The material and the thickness of the surface protecting member are not restricted, and, for example, any of various plastic films may be used as the surface protecting member. For example, such a plastic film may be a polyethylene terephthalate (PET) film, a polyethylene (PE) film, a polypropylene (PP) film, or the like, and have a thickness in the range of 12 μm to 80 μm. The surface protecting member is temporarily attached to the optical member in the sheet product so that the optical member can be protected from scratches and spills, and when the optical member is actually used, the surface protecting member is peeled off.

The sheet products used to form the joined sheet product are not limited to two sheet products. For example, two or more sheet products may be joined in series to form the joined sheet product. The first sheet product used to form the joined sheet product and the second sheet product to be joined to the first sheet product may be the same or different in longitudinal length. In a preferred mode, the first sheet product used to form the joined sheet product and the second sheet product to be joined to the first sheet product are the same or substantially the same in transverse length. In an embodiment of the invention, the "longitudinal length" of the sheet product is preferably ten times or more the transverse length perpendicular thereto. The two or more sheet products to be joined may include the same member components or different member components. For example, the surface protecting member and the release film may be made of different products, or the pressure-sensitive adhesive may have a different composition.

The joining process includes opposing the transverse end face of the first sheet product to the transverse end face of the second sheet product and joining the release films of the first and second sheet products with the first joining member as the first joining step. The removing step includes removing a portion of the intended member including at least the surface protecting member so as to leave at least the release film and the pressure-sensitive adhesive provided on the release film among the constituent members of both or any one of the first and second sheet products, wherein the portion has a predetermined length from the transverse end face of the intended member. The second joining step after the removing step includes providing at least the second joining member on an exposed portion resulting from the removal of the intended member to join the surface protecting member sides of the first and second sheet products. The first and second joining steps may be performed in any order. In view of workability, the removing step and the second joining step are preferably performed after the first and second sheet products are fixed by joining the release films in the first joining step. Alternatively, the removing step may be first performed, and then the first and second joining steps may be performed in parallel. The removing step may also be followed by the first joining step and then the second joining step. The initially performed joining step preferably includes temporarily fixing the opposite sides of the first and second sheet products from the sides to be joined. Examples of the temporarily fixing method include, but are not limited to, a method of fixing the first and second sheets onto a sucking surface under negative pressure, a method of holding and fixing with a jig, and temporary attachment with a pressure-sensitive adhesive tape. A preferred example of the joining process includes sucking and fixing the first joining member onto a suction table, temporarily fixing the first and second sheet products while placing them opposite to each other, and bonding them to the first joining member on the suction table.

As used herein, the term "oppose" means that the end faces of the first and second sheet products are placed with a gap of, for example, 0.1 mm to 20 mm between them or without any gap between them, while there is no overlap between the sheet products. When the end faces of the first and second sheet products are opposed to each other, the end face lines are preferably parallel to each other. Before the joining step, therefore, the end face portion of the first and/or second sheet product may be cut parallel to the transverse direction of the sheet product. The gap between the end faces of the first and second sheet products is preferably 10 mm or less, more preferably 6 mm or less, even more preferably 3 mm or less.

For example, the first and/or second joining member may be an adhesive tape or the like. For example, a joining method in the first joining step may include opposing the end faces of the first and second sheet products to each other and pressing a heat sealing tool directly against the surfaces of the opposed sheet portions to join the surfaces of the sheet portions by heat fusion. In this case, the sheet surface member produced through melting and solidification corresponds to the first joining member. In the joining step, a single joining member is preferably used, and it is more preferably an adhesive tape. It is because when such an adhesive tape is used, the joining process can be completed in a short time even by hand. The first and/or second joining member is preferably placed over the whole transverse length of the sheet products. The second joining member is provided on at least an exposed portion resulting from the removal of the intended member. Therefore, the second joining member preferably has a width larger than the width of the intended member so that the surface protecting member sides of the first and second sheet products can be joined with it.

Examples of the adhesive tape include a pressure-sensitive adhesive-impregnated nonwoven fabric, a product composed of a backing of polypropylene or the like and a pressure-sensitive adhesive coating provided thereon, and so on. The adhesive tape preferably has a thickness in the range of 10 µm to 5 mm and an adhesive strength in the range of 1 N/25 mm to 30 N/25 mm. The adhesive strength may be tested by the 180 degree peel test according to JIS Z 0237 (1991). In this case, the sheet product is used to form the test plate (adherend). In addition, the adhesive tape preferably has a tensile strength of 100 N/25 mm or more and an elongation percentage of 200% or less. The tensile strength may be tested by the method according to JIS Z 0237 (1991). Under the conditions described above, the adhesive tape has no risk of breaking, even when the working operation for joining the sheet products is continuously performed.

The joining operation may be performed by hand. Alternatively, for example, the joining operation may be performed using a dedicated apparatus such as a bonding roll. For example, the bonding roll may have such a structure that a roll core is coated with a rubber layer with a thickness of about several to several tens of millimeters.

A non-limiting removing method in the removing step may include forming an incision with a cutter blade so that the intended member can be peeled and peeling off the intended member. In place of the cutter blade, a Thompson blade may be used and pressed to form the incision, or a laser may be used to form the incision. The incision is preferably formed using a tool capable of precisely determining the incision depth. A non-limiting method of peeling off the intended member may include bonding a pressure-sensitive adhesive tape to the intended member and peeling off the intended member from the sheet product.

Among the constituent members of both or any one of the first and second sheet products, at least the surface protecting member is included in the member intended to be removed (intended member), while at least the release film and the pressure-sensitive adhesive are left. For example, (1) the surface protecting member, (2) the surface protecting member and the optical member, or (3) the surface protecting member and a surface protecting member side-component of the optical member may be intended to be removed. In the removing step, a portion of the intended member, which has a predetermined length from the end face of the intended member, is removed so that an exposed portion is formed. The "predetermined length" should be enough to make it possible to place the second joining member. When the second joining member is an adhesive tape, for example, the "predetermined length" is preferably from about 5 to about 20 mm. If it is less than 5 mm, the adhering force produced by the adhesive tape may be small so that peeling failure may occur. If it is more than 20 mm, a sufficient adhering force can be provided, but a relatively large portion may be unavailable for the final product, which is not preferred. The adhering force between the exposed portion and the adhesive tape should be set to achieve the object of the invention, and therefore, the "predetermined length" may be set depending on it.

When the joined sheet product is obtained by the manufacturing method described above, for example, the sheet products can be continuously processed without stopping the manufacturing line. Therefore, it has high productivity. The joined sheet product may be wound into a roll, which may be stored or transported as a raw material roll. The structure of the joined sheet product makes it possible to smoothly and properly peel off only the release film placed on the pressure-sensitive adhesive without interference with other constituent members. In the process of peeling off the release film, the first and second sheet products are properly kept joined by the second joining member, which joins the surface members of the sheet products on the opposite side from the release film. Therefore, when the sheet product, from which the release film is peeled off, is attached to the desired object with the pressure-sensitive adhesive interposed therebetween, the continuous operation can be successfully retained, and the trouble with the continuous production can be significantly reduced.

In an embodiment of the invention, the process may include the step of peeling off the release film from a long sheet product. For example, this peeling off step is necessary in the process of peeling off the release film so that it can be inspected whether the sheet product has any defect. In another case where the release film needs to be replaced with another one, the release film has to be peeled off.

In an embodiment of the invention, the intended member may include at least a member of the first or second sheet product side toward which the release film will be peeled off from the joined sheet product in its longitudinal direction.

The features described below should be satisfied in order that only the intended release films may be continuously and smoothly peeled off without breaking at the joint portion. Referring to FIG. 2, the release films 12 and 22 may be peeled off in the direction from the first sheet product side to the second sheet product side. In this case, the relation $C \geqq A > B$ (formula 1) should be satisfied, wherein A represents the adhering force between the first joining member 30 and the release film 22 of the second sheet product 2 (at the portion indicated by an ellipse a), B represents the adhering force between the release film 22 of the second sheet product 2 and the pressure-sensitive adhesive layer 22a (at the portion indicated by an ellipse b), and C represents the adhering force between the second joining member 40 and the exposed portion 40b of the surface member (a polarizing plate corresponding to the optical member in FIG. 2) of the second sheet product 2 (at the portion indicated by an ellipse c).

The adhering forces may be measured by the adhesive strength test method described above. The adhering forces A and C are each preferably ten times or more greater than the adhering force B. When sheet products each with a width size of 1,300 mm or more are joined, the adhering forces A and C are each preferably 100 times or more (e.g., 100 to 300 times) the adhering force B. Concerning the adhering forces A, B and C, the adhering force B may be first determined according to the structure of the sheet product, and therefore, the adhering forces A and C may be appropriately determined by appropriately changing the joining members. For example, the sheet product may be a laminated structure including a surface protecting member of a polyethylene terephthalate film, a first acrylic pressure-sensitive adhesive layer, a polarizing plate, a second acrylic pressure-sensitive adhesive, and a silicone-treated polyethylene terephthalate release film. In this case, when the surface protecting member and the first acrylic pressure-sensitive adhesive layer are removed as the intended members, the adhering force B (peel force) between the second acrylic pressure-sensitive adhesive layer and the silicone-treated polyethylene terephthalate film is generally from 0.005 N/25 mm to 0.1 N/25 mm. In this case, the joining members to be used are preferably such that the adhering force A to the release film and the adhering force C to the surface protecting film can each be 10 times or more the adhering force B.

Another embodiment of the invention is directed to a joined sheet product, including:

first and second sheet products that are joined to each other and each include at least an optical member, a surface protecting member provided on one side of the optical member, and a release film provided on the other side of the optical member with a pressure-sensitive adhesive interposed therebetween;

a joint portion in which a transverse end face of the first sheet product and a transverse end face of the second sheet product are opposed and joined to each other;

a first joining member provided on the release films of the first and second sheet products in the joint portion;

an exposed portion formed by removing a portion of an intended member including at least the surface protecting member but not including the release film and the pressure-sensitive adhesive provided on the release film in the joint portion of both or any one of the first and second sheet products, wherein the portion of the intended member has a predetermined length from the end face of the transverse end face of the intended member; and a second joining member that is provided on the exposed portion and the surface protecting member side of both or any one of the first and second sheet products in the joint portion.

In an embodiment, the intended member may include at least a member of the first or second sheet product side toward which the release film will be peeled off from the joined sheet product in its longitudinal direction.

These joined sheet products are effective and advantageous, as is the joined sheet product manufactured by the above method of manufacture of the joined sheet product.

Another embodiment of the invention is directed to a method for manufacturing an optical display unit, including:

a cutting step for cutting the joined sheet product manufactured by the method of claim 2 or the joined sheet product of claim 4 with exception of the release film which form a part of the joined sheet product into a piece with a predetermined size by cutting means; and a bonding step for bonding the piece with the predetermined size to a substrate with the pressure-sensitive adhesive interposed therebetween while removing the release film.

The process is effective and advantageous as described below. While the joined sheet product may be manufactured in advance, the optical display unit manufacturing process preferably includes manufacturing the jointed sheet product. A first material roll including a roll of a first long sheet product may be placed, from which the first sheet product may be fed to the downstream process. With exception of the release film, the first sheet product may be cut into a predetermined size using cutting means (cutting step). The cut piece of the first sheet product may then be bonded to a substrate with the pressure-sensitive adhesive interposed therebetween (bonding step), while the release film is removed. In the above steps being continuously performed, another sheet product (referred to as "second sheet product" for explanation) needs to be joined to the first sheet product being supplied, in order to continuously supply the first sheet product.

In this process, the joining method includes: a first joining step including opposing a transverse end face of the first sheet product to a transverse end face of the second sheet product and joining the release films of the first and second sheet products with a first joining member; a removing step including removing a portion of an intended member including at least the surface protecting member so as to leave at least the release film and the pressure-sensitive adhesive provided on the release film among the constituent members of both or any one of the first and second sheet products, wherein the portion has a predetermined length from the transverse end face of the intended member; and a second joining step including providing a second joining member on at least an exposed portion resulting from the removal of the intended member to join the surface protecting member sides of the first and second sheet products. The intended member may include at least a member of the second sheet product side toward which the release film will be peeled off from the joined sheet product in its longitudinal direction. The first or second sheet product may also be a joined sheet product previously manufactured by joining two or more sheet products by the same joining method as described above.

As described above, the sheet products are joined without being overlapped with each other, so that only the release film can be accurately peeled off in a continuous process. In addition, the first and second joining member can each provide a sufficient adhering force, so that the joint portion can be prevented from breaking during the feeding. Therefore, the cutting step and the bonding step can be continuously performed, so that the optical display unit can be manufactured with significantly improved productivity.

The manufacturing process described above may further include the steps of removing the release film (a first release film removing step), inspecting any defect (a defect inspecting step), and bonding a release film to the sheet product with the pressure-sensitive adhesive interposed therebetween (a second release film bonding step).

In the defect inspection, any defect in the optical film can be inspected, regardless of whether the release film has any defect such as retardation existing in the release film and foreign matter or scratches adhering to or existing in the release film. The release film to be attached again to the sheet product may be a used or new one. In order that the release film to be attached again to the sheet product may be continuously supplied, the process preferably includes opposing the transverse end faces of release films to each other and joining, with a joining member, the opposite surfaces of the release films from the surfaces to be attached to the sheet product. This process makes it possible to continuously peel off only the release film attached again to the sheet product.

DESCRIPTION OF REFERENCE CHARACTERS

Figure 1:
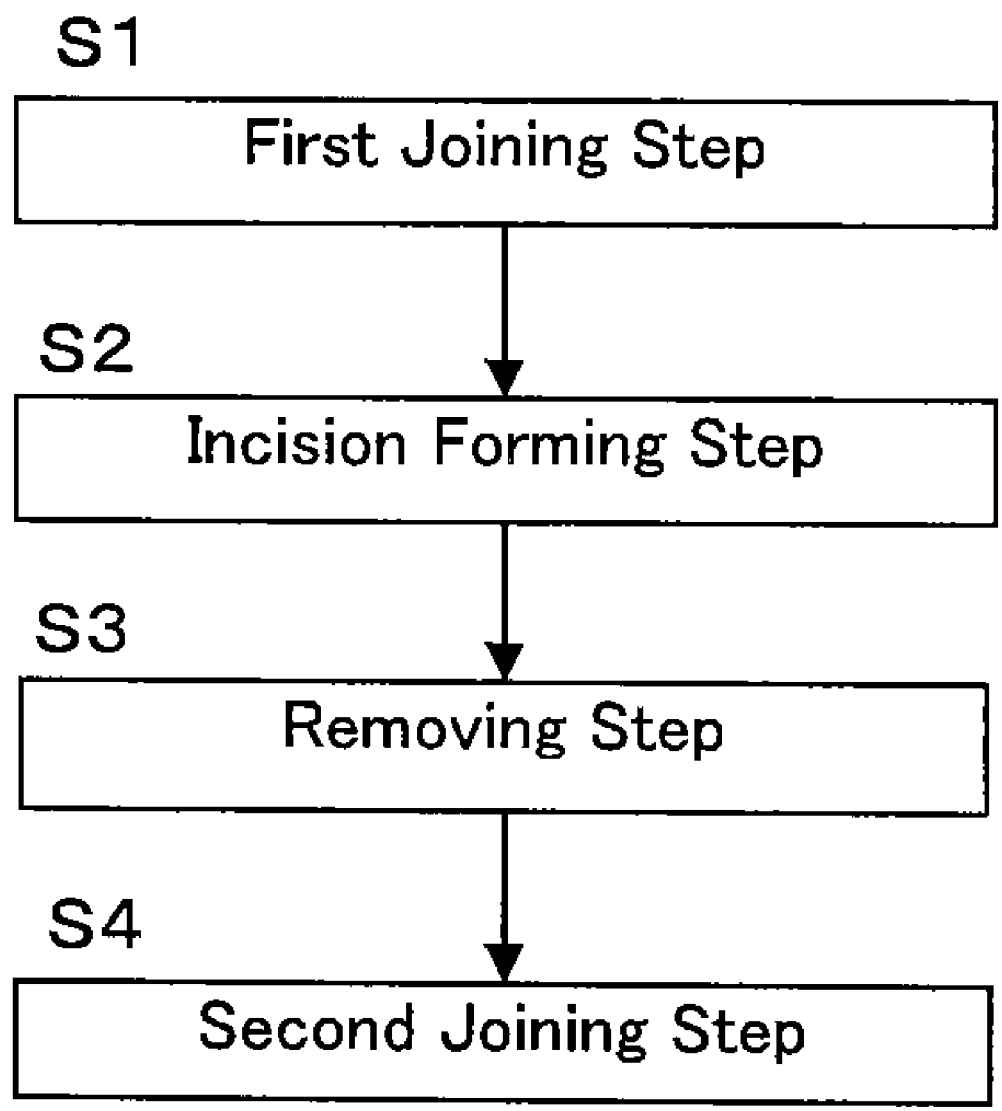
FIG. 1 is a flow chart of a joining method.

In the drawings, reference character 1 represents a first sheet product, 2 a second sheet product, 11a polarizing plate, 12a release film, 12a a second pressure-sensitive adhesive, 13a surface protecting film, 13a a first pressure-sensitive adhesive, 30a first joining member, 40a second joining member, and 40b an exposed portion.

BEST MODE FOR CARRYING OUT THE INVENTION

Embodiment 1

Figure 2:
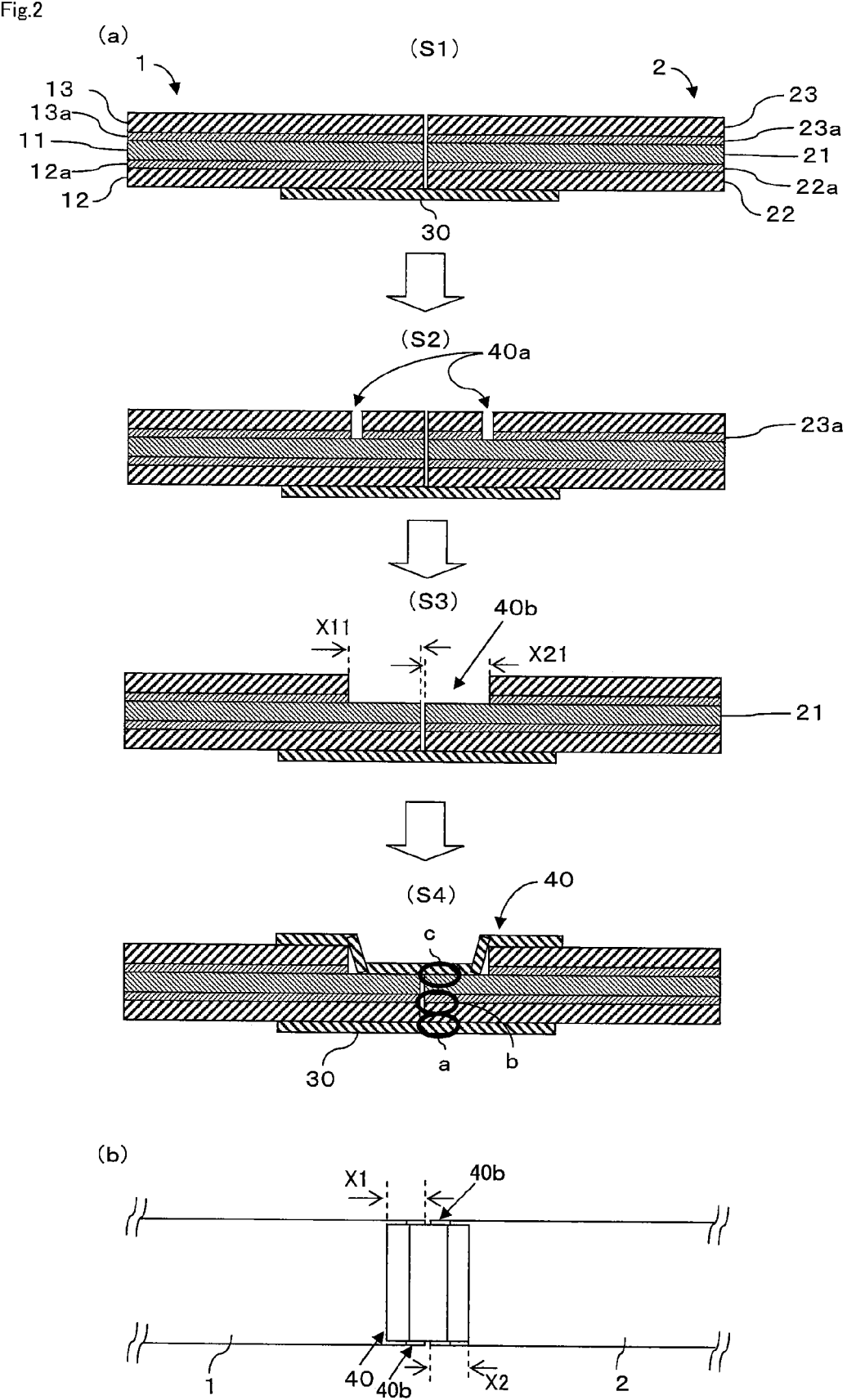
FIG. 2 is a schematic diagram for illustrating a joining method.

Embodiment 1 of the invention is described below. In this section, a description is given of how to join the first and second sheet products. FIG. 1 shows a flow chart of the procedure of a joining method. Part (a) of FIG. 2 shows an example of the cross-sectional structure of a joint portion where the first and second sheet products according to the flow chart of FIG. 1 are joined. Part (b) of FIG. 2 shows an exemplary plan view of the joint portion where the first and second sheet products are joined. FIGS. 3 to 6 show other exemplary modes of joint. Each of the first and second sheet products 1 and 2, for the description below, is, but not limited to, a laminated structure including a surface protecting film 13 or 23, a first pressure-sensitive adhesive 13a or 23a, a polarizing plate 11 or 21, a second pressure-sensitive adhesive 12a or 22a, and a release film 12 or 22.

(1) First Joining Step (S1 in FIGS. 1 and 2). The release films 12 and 22 of the first and second sheet products are joined with a first joining member 30 so that a transverse end face of the first sheet product 1 (crossing its longitudinal direction) can be opposed to a transverse end face of the second sheet product 2 (crossing its longitudinal direction). In this step, the joining member used is, but not limited to, an adhesive tape. First, a pressure-sensitive adhesive tape as the first joining member 30 is sucked and fixed onto a suction table (not shown). The first and second sheet products, which have been previously opposed to each other and temporarily fixed, are then bonded to the first joining member 30 on the suction table.

(2) Incision Forming Step and Removing Step (S2 and S3 in FIGS. 1 and 2). In this case, a predetermined length portion of the second sheet product 2, toward which the release film will be peeled off, is then removed from the end face so that the release film 22 and the second pressure-sensitive adhesive 22a of the second sheet product 2 can be left. In FIG. 2, the surface protecting film 23 and the first pressure-sensitive adhesive 23a each correspond to the member intended to be removed (the intended member). In addition, a predetermined length portion of the first sheet product 1 is also removed so that the release film 12 and the second pressure-sensitive adhesive 12a of the first sheet product 1 can be left. In FIG. 2, the surface protecting film 13 and the first pressure-sensitive adhesive 13a also each correspond to the intended member.

An incision 40a is formed in each intended member, while one side of the first joining member 30 is fixed and while the first and second sheet products 1 and 2 are fixed onto the suction table. The incision is preferably formed at a position about 5 to about 20 mm inward from the end face of the intended member. In FIG. 2, the lengths X11 and X21 of the portions removed from the end faces, respectively, are each 10 mm. A cutter is used as cutting means, and a control tool for controlling the incision depth is used not to form any incision in the other members. In the removing process, only the intended members are peeled off from the respective sheet products.

(3) Second Joining Step (S4 in FIGS. 1 and 2). The first and second sheet products 1 and 2 are then joined with a second joining member 40 so that the exposed portion 40b resulting from the removal can be covered with and bonded to it. In FIG. 2, the second joining member 40 is an adhesive tape. As shown in part (b) of FIG. 2, the second joining member 40 is attached to substantially the whole transverse length of the first and second sheet products. For example, the lengths X1 and X2 of the portions where the second joining member is bonded to the first and second sheet products 1 and 2, respectively, are 10 mm or more from the end faces of the first and second sheet products 1 and 2, respectively. The second joining member 40 is bonded to the surface protecting films 13 and 23 of the first and second sheet products 1 and 2 and to the exposed portions 40b of the polarizing plates 11 and 21. Specifically, the lengths of the portions where the first joining member 30 is bonded to the first and second sheet products 1 and 2, respectively, are 10 mm or more from the end faces of the first and second sheet products 1 and 2, respectively.

According to this process, the end faces of the two sheet products are opposed and joined so that only the intended release films can be peeled off without any failure such as breaking at the joint portion.

Figure 3:
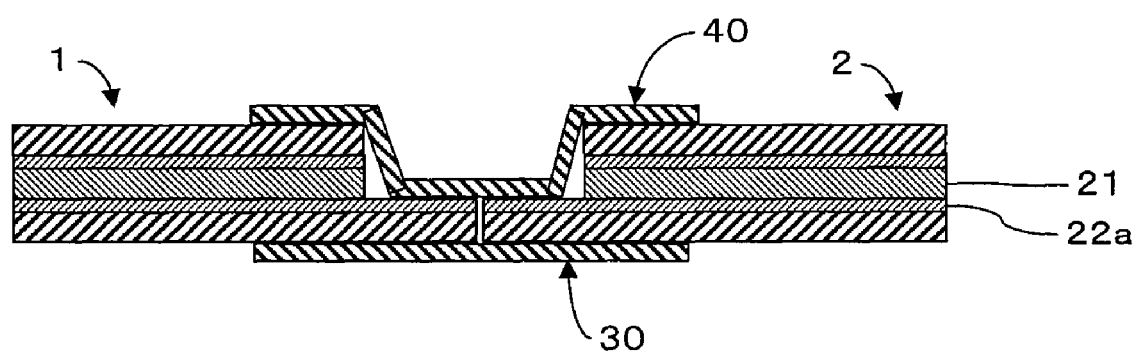
FIG. 3 is a schematic diagram for illustrating another joining method.

A description is given below of portions formed by cutting, removing, and joining according to other embodiments. Part (a) of FIG. 3 shows an example in which the first and second sheet products 1 and 2 are partially cut and removed, respectively, until the cut and removed portion reaches the polarizing plates 11 and 21 so that the surfaces of the second pressure-sensitive adhesives 12a and 22a are exposed, and the second joining member 40 is bonded to the surfaces of the second pressure-sensitive adhesives 12a and 22a and to the surface protecting films 13 and 23, respectively.

Figure 4:
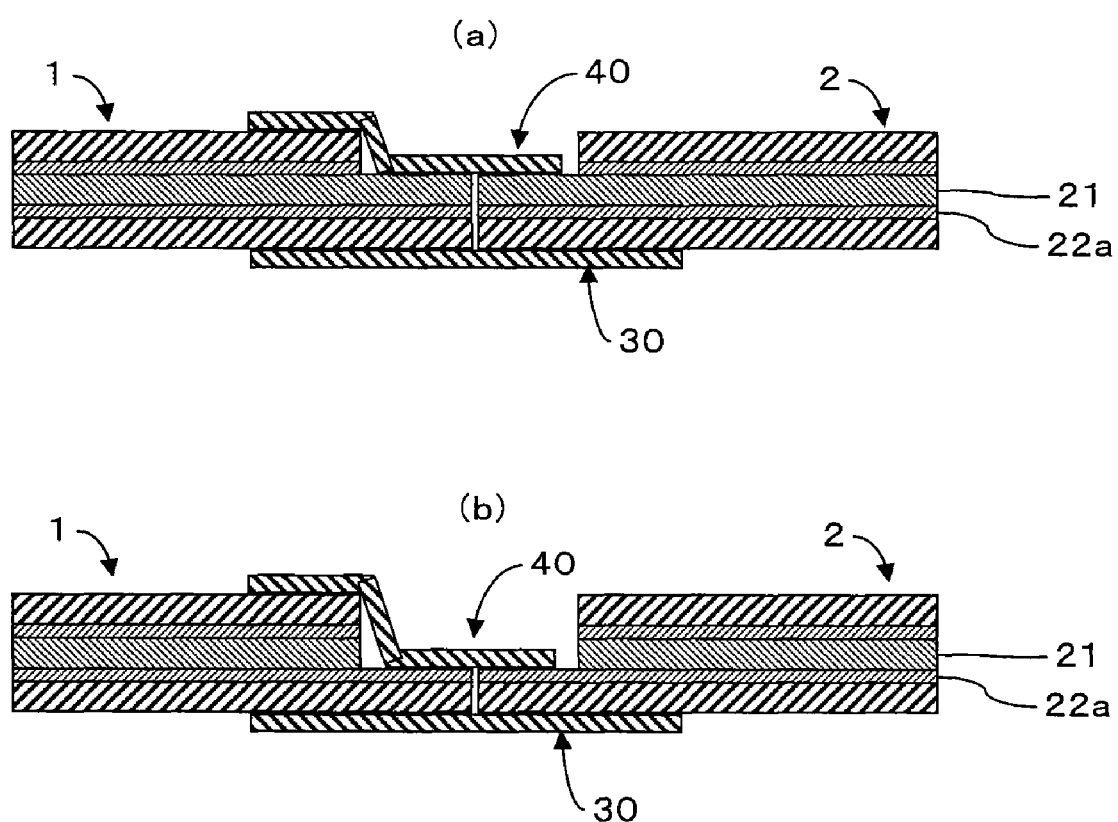
FIG. 4 is a schematic diagram for illustrating a further joining method.

Part (a) of FIG. 4 shows another example in which the first and second sheet products 1 and 2 are partially cut and removed, respectively, until the cut and removed portion reaches the first pressure-sensitive adhesives 13a and 23a so that the surfaces of the polarizing plates 11 and 21 are exposed, and the second joining member 40 is bonded to the surfaces of the polarizing plates 11 and 21, respectively, and to the surface protecting film 13 of the first sheet product 1.

Part (b) of FIG. 4 shows a further example in which the first and second sheet products 1 and 2 are partially cut and removed, respectively, until the cut and removed portion reaches the polarizing plates 11 and 21 so that the surfaces of the second pressure-sensitive adhesives 12a and 22a are exposed, and the second joining member 40 is bonded to the surfaces of the second pressure-sensitive adhesives 12a and 22a, respectively, and to the surface protecting film 13 of the first sheet product 1.

Figure 5:
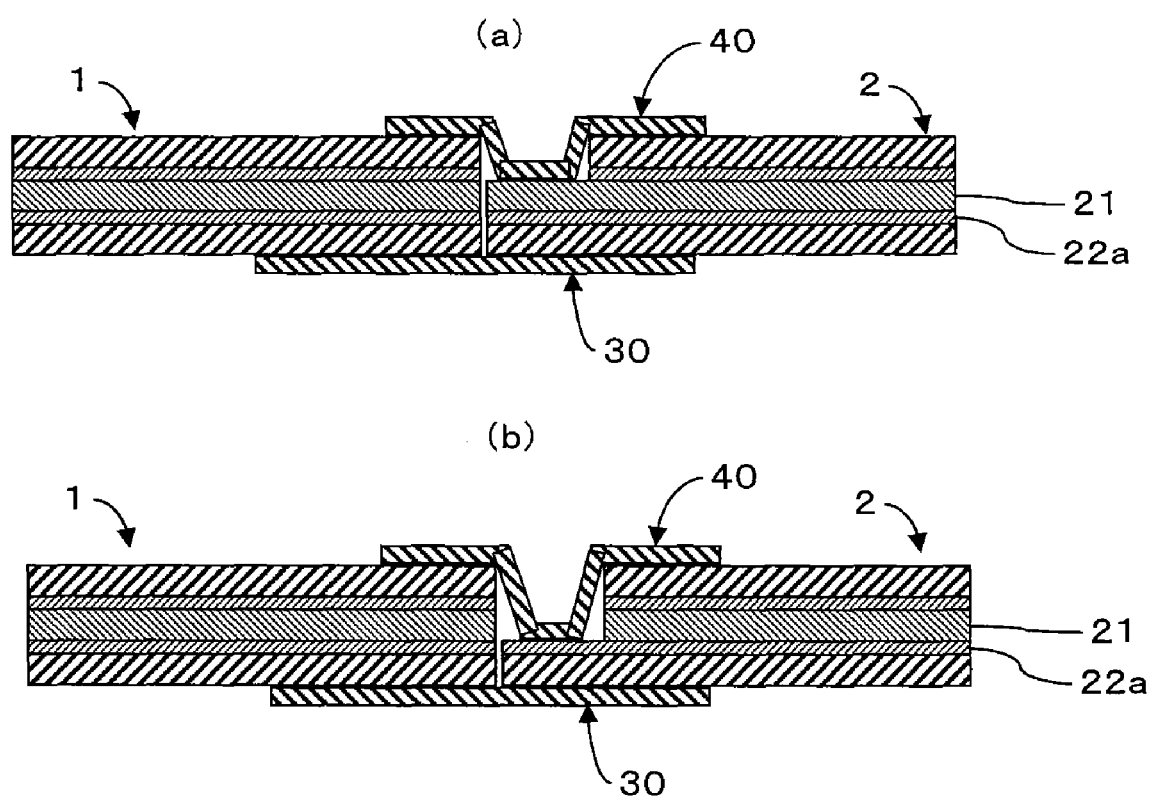
FIG. 5 is a schematic diagram for illustrating a further joining method.

Part (a) of FIG. 5 shows a further example in which the second sheet product 2 is partially cut and removed until the cut and removed portion reaches the first pressure-sensitive adhesive 23a so that the surface of the polarizing plate 21 is exposed, and the second joining member 40 is bonded to the surface of the polarizing plate 21 and to the surface protecting films 13 and 23 of the first and second sheet products 1 and 2, respectively. Part (b) of FIG. 5 shows a further example in which the second sheet product 2 is partially cut and removed until the cut and removed portion reaches the polarizing plate 21 so that the surface of the second pressure-sensitive adhesive 22a is exposed, and the second joining member 40 is bonded to the surface of the second pressure-sensitive adhesive 22a and to the surface protecting films 13 and 23 of the first and second sheet products 1 and 2, respectively.

Figure 6:
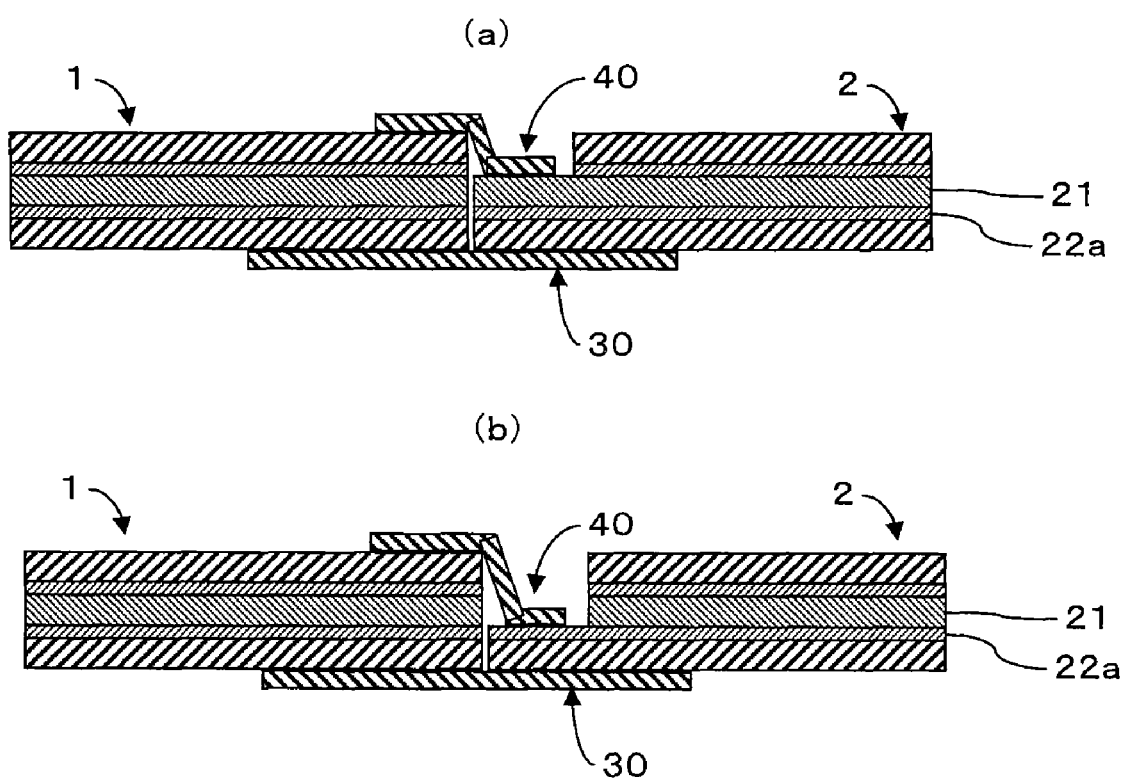
FIG. 6 is a schematic diagram for illustrating a further joining method.

Part (a) of FIG. 6 shows a further example in which the second sheet product 2 is partially cut and removed until the cut and removed portion reaches the first pressure-sensitive adhesive 23a so that the surface of the polarizing plate 21 is exposed, and the second joining member 40 is bonded to the surface of the polarizing plate 21 and to the surface protecting film 13 of the first sheet product 1. Part (b) of FIG. 6 shows a further example in which the second sheet product 2 is partially cut and removed until the cut and removed portion reaches the polarizing plate 21 so that the surface of the second pressure-sensitive adhesive 22a is exposed, and the second joining member 40 is bonded to the surface of the second pressure-sensitive adhesive 22a and to the surface protecting film 13 of the first sheet product 1.

Method for Manufacturing Joined Sheet Product

The method of the invention for manufacturing a joined sheet product is described below. In the description, a laminate of a surface protecting film, a pressure-sensitive adhesive, a polarizing plate, another pressure-sensitive adhesive, and a release film is used as an example of the structure of the sheet product used to form the joined sheet product.

(1) Step of Obtaining Polarizer. In this step, a polyvinyl alcohol (PVA) film is dyed, crosslinked, stretched, and dried to give a polarizer. (2) Step of Manufacturing Polarizing Plate. In this step, polarizer protecting films are placed on both sides of the polarizer with an adhesive interposed therebetween, and the resulting laminate is dried to give a polarizing plate. The polarizer protecting films bonded to both sides may have the same or different compositions. The polarizer protecting film to be placed on the viewer side of a display may have been previously subjected to an antiglare treatment.

(3) Step of Bonding Release Film and Surface Protecting Film. A release film is bonded to one side of the polarizing plate with a strong pressure-sensitive adhesive interposed therebetween, and a surface protecting film is bonded to the other side with a weak pressure-sensitive adhesive interposed therebetween. In this process, the release film and the surface protecting film have been previously coated with the strong pressure-sensitive adhesive and the weak pressure-sensitive adhesive, respectively. After the release film is peeled off, the strong pressure-sensitive adhesive, which has been applied to the release film, is transferred to the polarizer protecting film. Even when the surface protecting film is peeled off, the weak pressure-sensitive adhesive, which has been applied to the surface protecting film, still remains on the surface protecting film and is substantially not transferred to the polarizer protecting film. In the steps (1) to (3), a long sheet product is manufactured and wound into a roll, which is subjected to the next step. (4) Step of Slitting Material Roll. Since the material roll is wide, the material is slit into a predetermined size depending on the size of the final product, an optical display unit. Optionally, a specific check may be performed by a checker in each of the above steps, or various automatic inspections (such as known defect inspections) may be performed with inspection systems.

(5) The step of peeling off the release film from the long sheet product obtained by slitting is performed (peeling step). For example, this step is necessary when a defect inspection is performed on the sheet product with the release film peeled off. In another case, the release film has to be peeled off, when it needs to be replaced with another one. In these cases, if the first and second sheet products need to be continuously subjected to the process, the first and second sheet products must be joined. In a case where the predetermined roll length (e.g., 2,000 m) is not reached, such as a case where the long sheet is partially cut due to a continuous defective state, two or more material rolls may be joined into a single material roll. In these cases, the joining method described above is preferably used in the process of joining the first and second sheet products. According to this method, only the release film can be well peeled off, and the above peeling step can be performed well.

Alternatively, without the above peeling step, the first and second sheet products may be properly joined using the above joining method, so that a single material roll can be formed. For example, when the full length of the first sheet product is less than the desired length, the first and second sheet products may be joined to form a material roll.

Method for Manufacturing Optical Display Unit

Figure 7:
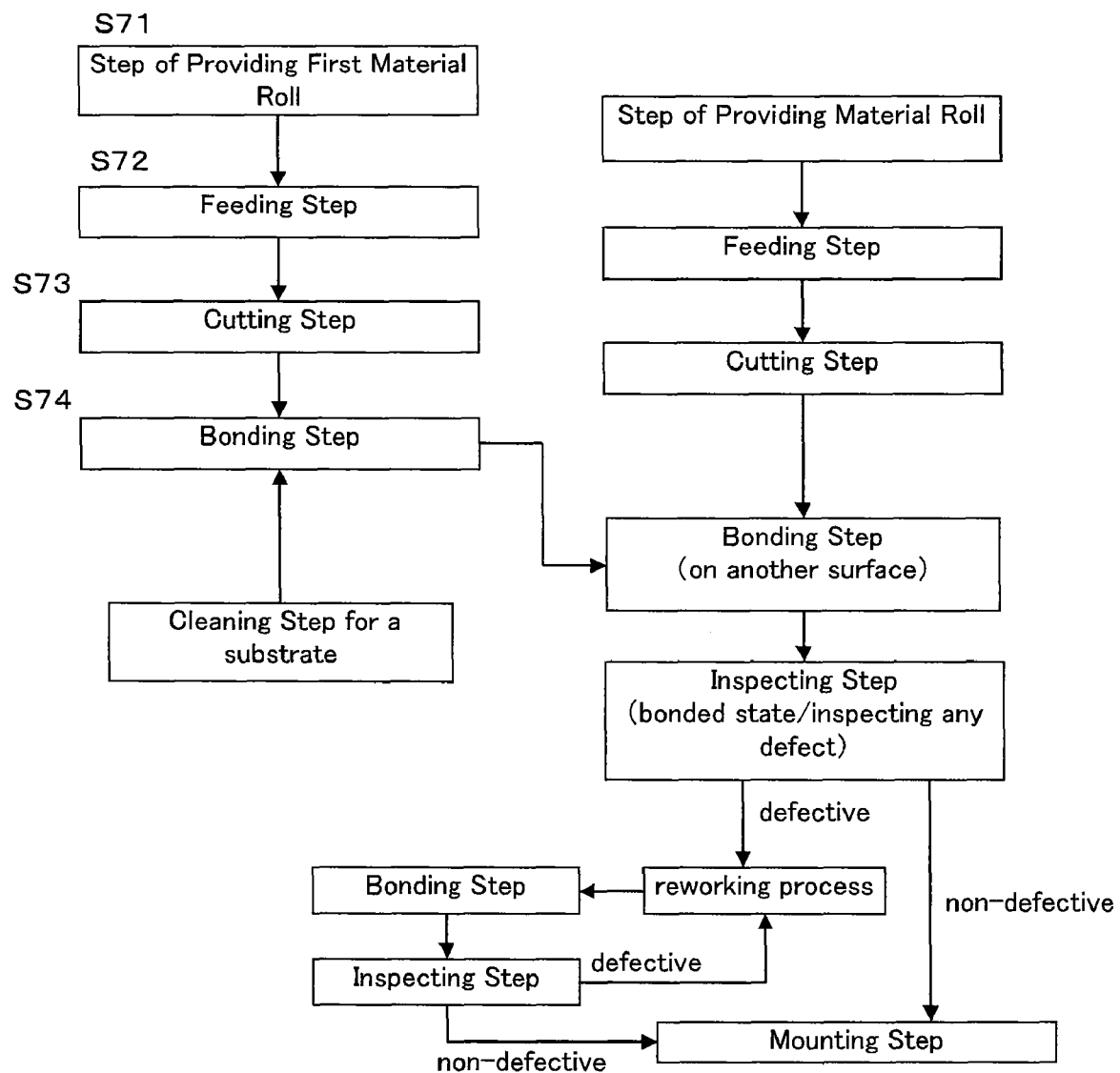
FIG. 7 is a flow chart of a method for manufacturing an optical display unit.

Next, a method for manufacturing an optical display unit is described below. FIG. 7 shows a flow chart of a method for manufacturing an optical display unit.

(1) Step of Providing First Material Roll (S71 in FIG. 7). A first material roll of a first long sheet product is provided. In the description, a laminate of a surface protecting film, a polarizing plate and a release film is used as an example. The release film is provided on one side of the polarizing plate with a pressure-sensitive adhesive interposed therebetween, and the surface protecting film is provided on the other side of the polarizing plate with a pressure-sensitive adhesive interposed therebetween. The polarizing plate includes a polarizer and polarizer protecting films provided on both sides of the polarizer. Each pressure-sensitive adhesive forms a layer.

(2) Feeding Step (S72 in FIG. 7). The first sheet product is fed from the first material roll to the downstream process. The feeding mechanism of the feeding means may include known means, and for example, the sheet product may be inserted between a pair of rolls and fed by the rotary action of the pair of rolls.

(3) Cutting Step (S73 in FIG. 7)

The first sheet product fed from the feeding means is then partially cut by cutting means so that constituent members of the first sheet product other than the release film can be cut into a predetermined size. Therefore, other members of the first sheet product including the surface protecting film, the pressure-sensitive adhesive, the polarizing plate, and the pressure-sensitive adhesive may be cut without the release film being cut. For example, the cutting means may be a laser, a cutter or any other known cutting means.

(4) Bonding Step (S74 in FIG. 7). After the cutting step, the first sheet product with the release film being removed is then bonded to a substrate with the pressure-sensitive adhesive interposed therebetween. For example, the substrate may be a glass substrate of a liquid crystal cell, an organic EL emitter substrate, or the like. The substrate has been previously cleaned before the bonding step.

The respective steps are performed in a continuous manufacturing line. The process also includes the step of joining the end of the first sheet product to the end of the second sheet product so that the process can be continuously performed even when the product is changed to the second sheet product. The joining method described above is preferably used in this joining process.

Thus, the end faces of the two sheet products are opposed and joined to each other so that only the intended release film can be properly peeled off. In the bonding step, therefore, the sheet product with only the release film being peeled off can be bonded to the substrate with the pressure-sensitive adhesive interposed therebetween.

In the series of manufacturing steps, the first sheet product is bonded to one side of the substrate. Another sheet product may also be bonded to the other side by the same bonding process as described above.

(5) An inspecting step (FIG. 7) is also preferably performed as part of the continuous process. Examples of the inspecting step include the step of inspecting the bonded state and the step of inspecting any defect after the bonding. Both inspections are preferably performed, while any one of the inspections may be performed.

(6) The substrate determined as non-defective in the inspecting step is used to form an optical display device (mounting step). When it is determined as defective, it is subjected to a reworking process in which a new optical film is bonded and then inspected, and when the product is determined as non-defective, it is subjected to the mounting step, but when the product is determined as defective, it is subjected to the reworking process again or discarded.

Skip Cutting Method

Another mode of the cutting step is described below. Information about defects the first sheet product (such as coordinates of defects, defect type, and defect size) may be attached as coded information (e.g., QR code or bar code) to one transverse end portion of the first material roll per specific pitch unit (e.g., 1,000 mm). In such a case, the coded information may be read and analyzed at a stage before cutting, and then in the first cutting step, the product may be cut into a predetermined size so that the defects can be separated (this process is also referred to as skip cutting). The system may be configured so that the defect-containing portion can be rejected or bonded to a certain member other than the substrate and that the cut piece of the sheet product having the predetermined size and determined as non-defective can be bonded to the substrate. This process significantly improves the yield of the optical display unit.

Another Method for Manufacturing Optical Display Unit

Figure 8:
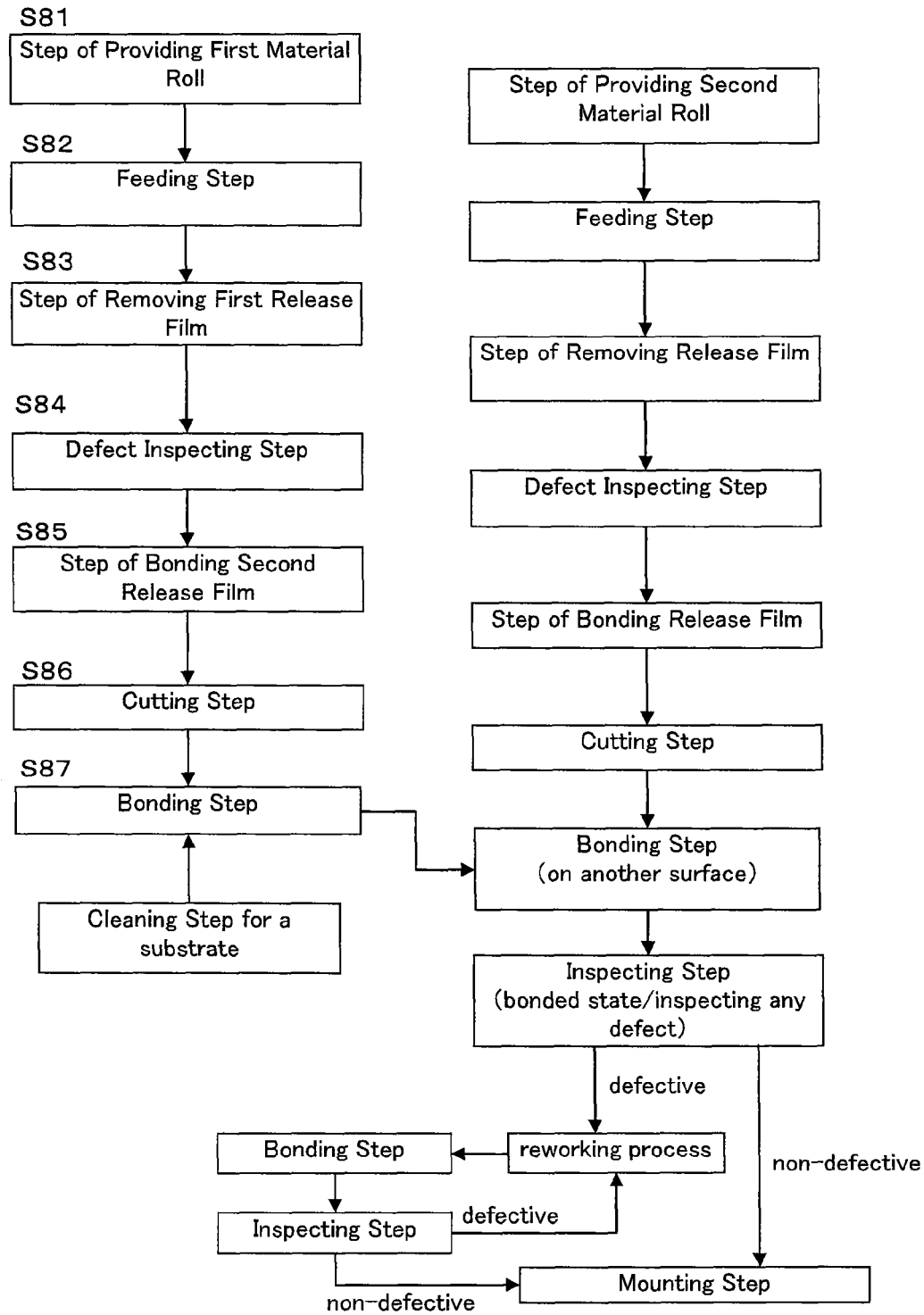
FIG. 8 is a flow chart of another method for manufacturing an optical display unit.

Next, another method for manufacturing an optical display unit is described below. FIG. 8 shows a flow chart of another method for manufacturing an optical display unit. In the description, the same step as that in the above manufacturing method is briefly described or omitted.

(1) Step of Providing First Material Roll (S81 in FIG. 8). A first material roll of a first long sheet product is provided. The structure of the sheet product (the first or second sheet product) is the same as described above.

(2) Feeding Step (S82 in FIG. 8). After the step of providing the material roll, the first sheet product is fed from the material roll to the downstream process (feeding step).

(3) Step of Removing First Release Film (S83 in FIG. 8). The first release film is removed from the first sheet product being fed. Examples of a method for removing the first release film include a method including continuously separating the film, while winding the separated film on a roll, a method including cutting only the first release film into units with a predetermined size and peeling off and removing each unit with a pressure-sensitive adhesive tape, and a removing method including any other process.

(4) Defect Inspecting Step (S84 in FIG. 8). After the step of removing the first release film, defect inspection is performed. In this case, the defect inspection can be performed on the optical film, regardless of whether the first release film has a retardation. The defect inspection may be performed using known methods.

(5) Step of Bonding Second Release Film (S85 in FIG. 8). After the defect inspecting step, a second release film is bonded to the first sheet product with the second pressure-sensitive adhesive layer interposed therebetween. To maintain the flatness, it is preferred that the bonding step should be performed so that bubbles such as air bubbles may not be trapped.

(6) Cutting Step (S86 in FIG. 8). The first sheet product fed from the feeding means is then partially cut by cutting means so that constituent members of the first sheet product other than the second release film can be cut into a predetermined size.

(7) Bonding Step (S87 in FIG. 8). After the cutting step, the first sheet product with the second release film being removed is bonded to a substrate with the pressure-sensitive adhesive interposed therebetween.

The respective steps are performed in a continuous manufacturing line. The process also includes the step of joining the end of the first sheet product to the end of the second sheet product so that the process can be continuously performed even when the product is changed to the second sheet product. The joining method described above is preferably used in this joining process.

In the series of manufacturing steps, the first sheet product is bonded to one side of the substrate. Another sheet product may also be bonded to the other side by the same bonding process as described above. The inspecting step, the mounting step and so on are the same as those described above.

Figure 9:
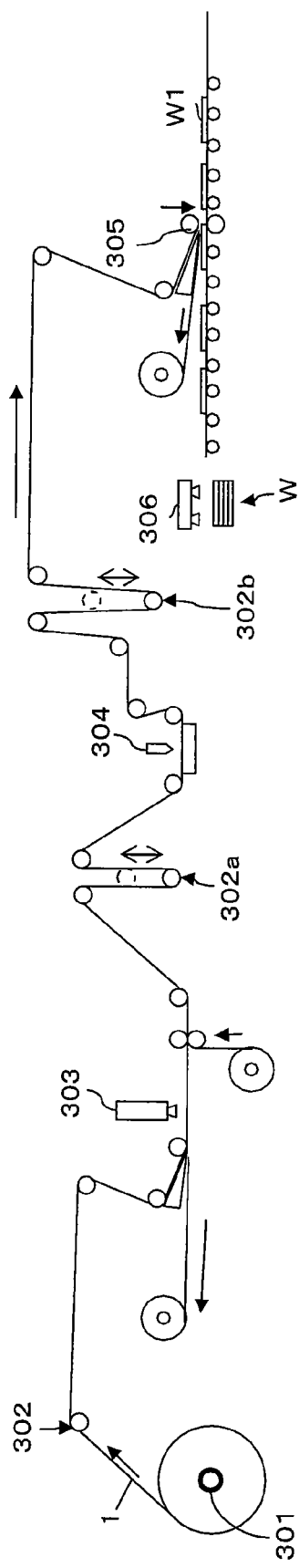
FIG. 9 is a diagram for illustrating the configuration of a manufacturing system according to the invention.
Figure 10:
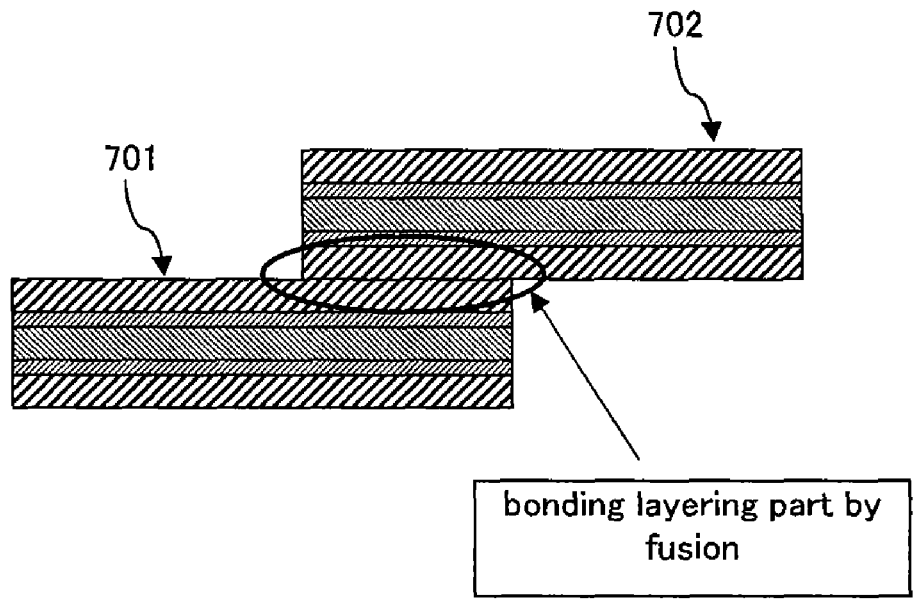
FIG. 10 is a diagram for illustrating conventional joining methods.
Figure 10:
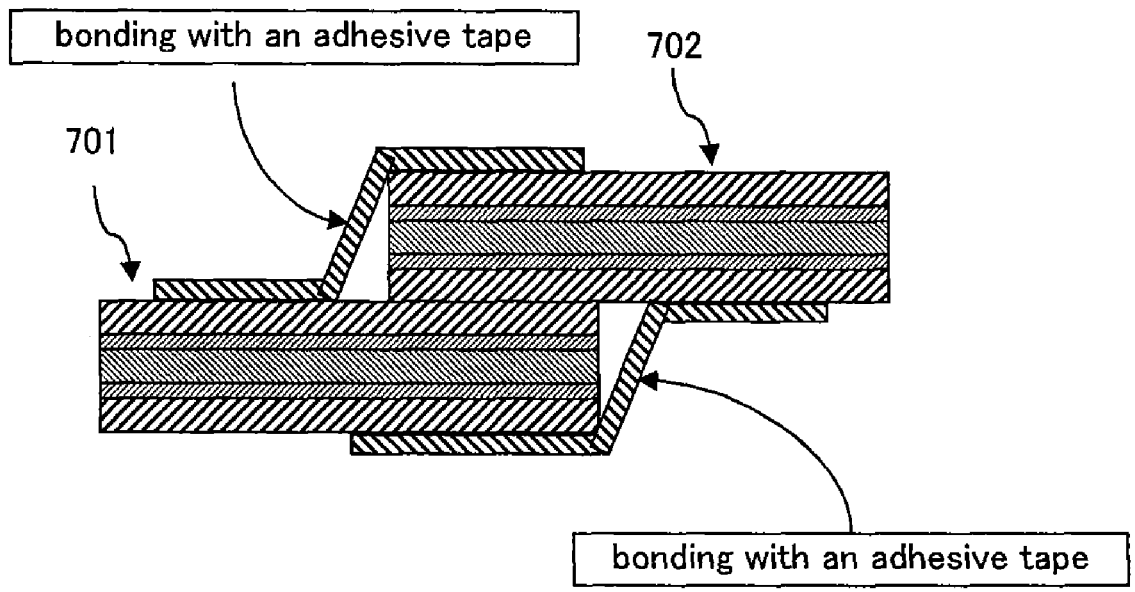
Figure 11:
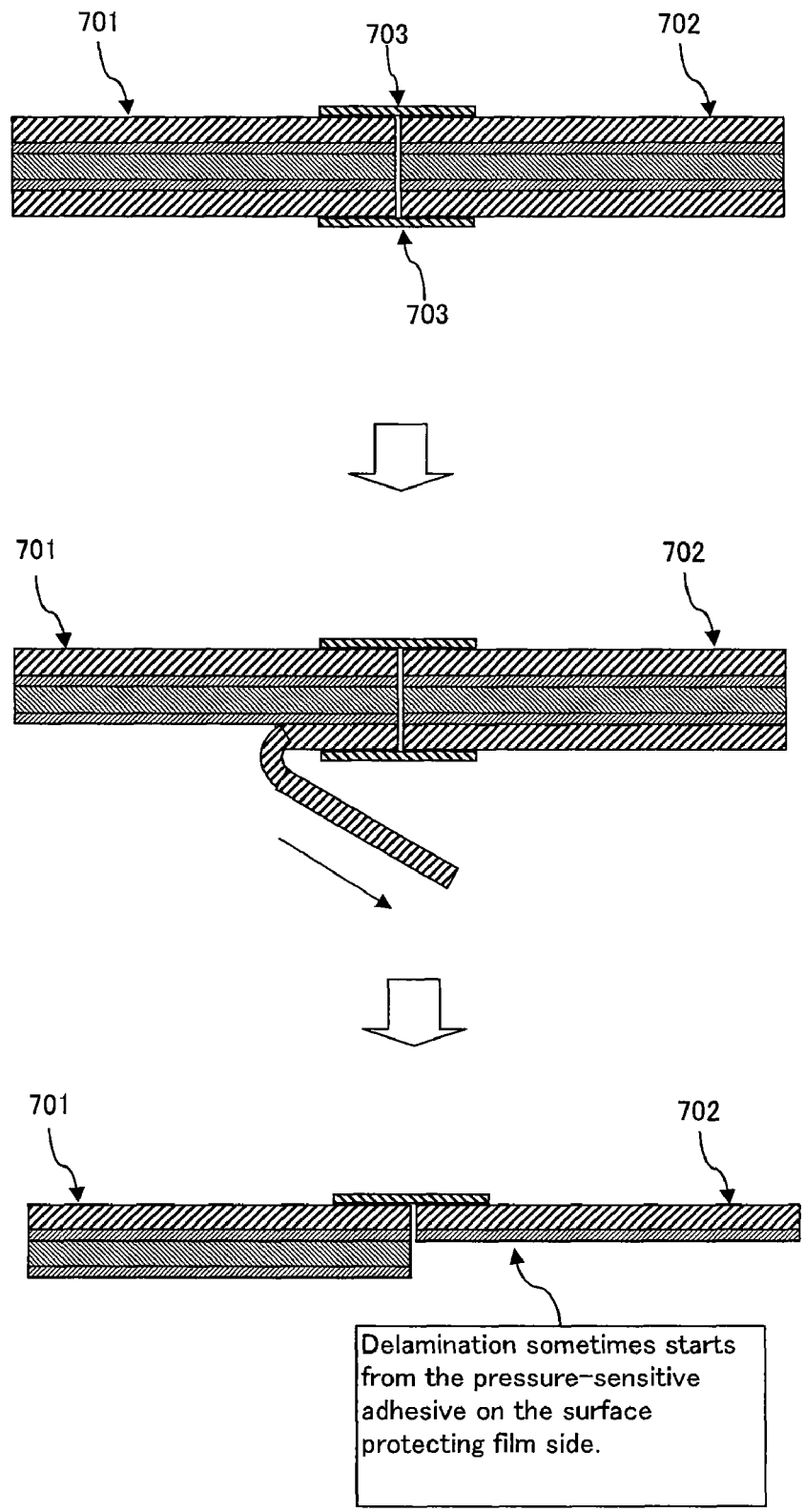
FIG. 11 is a diagram for illustrating other conventional joining methods.

Preferred Manufacturing System for Performing the Optical Display Unit Manufacturing Method A preferred manufacturing system for performing the above other optical display unit manufacturing method is described below. FIG. 9 schematically shows the configuration of the manufacturing system.

As shown in FIG. 9, the manufacturing system includes: a first manufacturing unit for bonding the first sheet product 1 to the substrate and a second manufacturing unit for bonding the second sheet product to the surface of the substrate other than the substrate surface to which the first sheet product is bonded. The first and second sheet products each have the same structure as that of the sheet product in FIG. 1.

The first manufacturing unit includes: mounting means on which the first material roll of the first long sheet product 1 is mounted; feeding means for feeding the first sheet product 1 from the first material roll; first release film-removing means for removing the first release film from the first sheet product 1 being fed; defect inspecting means for performing defect inspection after the removal of the first release film; second release film-bonding means for bonding a second release film to the first sheet product 1 with the pressure-sensitive adhesive interposed therebetween after the first defect inspection; cutting means for cutting the first sheet product 1 into a predetermined size without cutting the second release film after the bonding of the second release film; bonding means for bonding the first sheet product, from which the second release film is being removed, to the substrate with the pressure-sensitive adhesive interposed therebetween after the cutting; and first control means for synchronizing and controlling the respective means.

The second manufacturing unit includes: mounting means on which the second material roll of the second long sheet product is mounted; feeding means for feeding the second sheet product from the second material roll; third release film-removing means for removing the third release film from the second sheet product being fed; second defect inspecting means for performing defect inspection after the removal of the third release film; fourth release film-bonding means for bonding a fourth release film to the second sheet product with the pressure-sensitive adhesive interposed therebetween after the second defect inspection; cutting means for cutting the second sheet product into a predetermined size without cutting the fourth release film after the bonding of the fourth release film; bonding means for bonding the second sheet product, from which the fourth release film is being removed, to the surface of the substrate other than the substrate surface to which the first sheet product is bonded, with the pressure-sensitive adhesive interposed therebetween after the cutting; and second control means for synchronizing and controlling the respective means.

The first and second manufacturing units may be each independently driven or driven in a synchronized manner. The first and second control means may be used to drive and control the series of steps in a synchronized manner. The release film removing means, the defect inspecting means, or the release film bonding means may be omitted from the system.

First Manufacturing Unit

Mounting means 301 includes a roll mount apparatus on which the first material roll of the first long sheet product 1 is mounted and which is geared to a motor or the like to rotate freely or at a certain speed. The first control means controls the rotational speed and the driving.

Feeding means 302 feeds the first sheet product 1 from the first material roll and to each step. A tension controller is placed at a key point in each step. The feeding means 302 is controlled by the first control means.

The first release film-removing means is configured to delaminate and remove the first release film from the first sheet product 1 being fed and to wind it into a roll. The speed of winding it into the roll is controlled by the first control means. The delaminating mechanism has a sharp-ended knife edge and is configured so that the first release film can be delaminated and removed by taking up the first release film with the knife edge and turning the direction of the feeding and that the first sheet product 1 separated from the first release film can be fed in the feeding direction.

Defect inspecting means 303 inspects defects after the removal of the first release film. The defect inspecting means 303 includes a CCD camera or a CMOS camera, and the image data taken by it are sent to the first control means. The first control means analyzes the image data to detect defects and calculates their position coordinates. The defect position coordinates are used in the skip cutting process with the cutting means described below.

Second release film-bonding means bonds a second release film to the first sheet product with the pressure-sensitive adhesive interposed therebetween after the defect inspection. As shown in FIG. 6, the second release film is unwound from a material roll of the second release film, and the second release film and the first sheet product are inserted between one or more pairs of rollers so that they are bonded to each other under a certain pressure from the pair of rollers. The rotational speed of the pair of rollers, the pressure, and the feeding are controlled by the first control means.

Cutting means 304 cuts the first sheet product 1 into a predetermined size without cutting the second release film after the bonding of the second release film. The cutting means 304 is a laser system. Based on the defect position coordinates detected by the defect inspection, the cutting means 304 cuts the product into the predetermined size in such a manner that defective portions can be separated. Therefore, cut pieces having any defective portion are rejected as defective in a later step. Alternatively, the cutting means 304 may ignore defective portions and continuously cut the product into the predetermined size. In this case, the bonding process may be designed not to bond, but to remove the defective portion or to bond the defective portion to a temporary plate unit, as described below. In this case, the first control means may also function to control the process.

The cutting means 304 also includes a holding table placed to adsorb and hold the first sheet product 1 from the back side, and the laser system is placed above the first sheet product 1. The laser system is moved in the horizontal direction to scan the first sheet product 1 in the width direction, so that the first sheet product is cut at a predetermined pitch in the feeding direction, while the second release film at the bottom is left uncut. This cutting technique is also referred to as "half cutting." In the laser system, an air nozzle for blowing a warm wind to the portion being cut and a smoke collecting duct for collecting gas (smoke) generated from the portion being cut and carried by the warm wind are preferably configured in combination and placed opposite to each other across the width of the first sheet product 1. The feeding mechanism includes step rollers 302a and 302b provided vertically movable upward and downward so that continuous feeding of the first sheet product 1 can be prevented from being stopped on the upstream and downstream sides when the holding table adsorbs the first sheet product 1. This operation is also controlled by the first control means.

After the cutting process, bonding means bonds the first sheet product 1 (from which the second release film has been removed) to the substrate W with a pressure-sensitive adhesive interposed therebetween, while it removes the second release film. In the bonding process, a press roller 305 is used to press the first sheet product 1 against the surface of the substrate W so that it can be bonded to the surface. The pressure and movement of the press roller 305 are controlled by the first control means. The delamination mechanism has a sharp-ended knife edge and is configured so that the second release film can be peeled off by taking up the second release film with the knife edge and turning the direction of the feeding and that the first sheet product 1 peeled off from the second release film can be fed to the surface of the substrate W. This process may include applying a tension of 150 N/m to 1,000 N/m to the second release film and/or pressing the first sheet product against the surface of the substrate W within 3 seconds from the removal of the second release film, so that the first sheet product 1 can be bonded with improved accuracy. If the tension is less than 150 N/m, the position from which the first sheet product is fed may be unstable. If it is more than 1,000 N/m, the second release film may be elongated to break. If the time until the pressing is longer than 3 seconds, the end portion of the first sheet product peeled off from the second release film may be bent so that folding or air bubbles may occur. The bonding mechanism includes the press roller 305 and a guide roller opposed thereto. The guide roller includes a rubber roller driven by a motor, and immediately above the guide roller, the press roller 305 comprising a metallic roller driven by a motor is provided movable upward and downward. When the substrate W is fed to the bonding position, the press roller 305 is elevated to a position higher than the upper surface so that the space between the rollers is widened. Alternatively, the guide roller and the press roller 305 may each be a rubber roller or a metallic roller. The substrate W has been previously cleaned by cleaning means and stored in a storing unit. It is placed on the feeding mechanism by suction feeding means 306, which is also controlled by the first control means.

Second Manufacturing Unit

The substrate W1 fed from the first manufacturing unit is turned upside down in the feeding process or in the second manufacturing unit. The turning means (not shown) is configured to suck the substrate W1 from the upper side by sucking means, lift it, turn it upside down, and place it the feeding mechanism again. The second control means functions to control this process. In another embodiment, the second manufacturing unit may be configured not to turn it upside down. In this case, the second manufacturing unit is configured to perform each step with the second sheet product being held in a reversed state (with the release film facing upward), unlike the usual state, and to bond the second sheet product to the lower side of the substrate W1. When the bonding is performed so that the polarizing plate of the second sheet product can be in 90° relation (crossed Nicol relation) to the polarizing plate of the first sheet product, the substrate W is turned by 90°, and then the second sheet product is bonded thereto. In the second manufacturing unit for the respective steps, the mounting means, the feeding means, the third release film removing means, the defect inspecting means, the fourth release film bonding means, and the cutting means are the same as the corresponding means of the first manufacturing unit, and therefore, the description thereof is omitted.

The first and second control means control the means for the respective steps so that they can be synchronized. The timing of the operation of each means is calculated by a method using sensors placed at specific locations or by a method of detecting the rotating part of the feeding mechanism with a rotary encoder or the like. The first and second control means may be implemented in cooperation with software programs and hardware resources such as CPU and memories. In this case, program software, procedures, various settings, and so on are previously stored in memories. Private circuits, firmware, or the like may also be used for the implementation.

Other Embodiments

In the above embodiments, defect-containing sheet products are bonded to temporary units and collected. Alternatively, such products may be bonded to a belt-shaped separator so that they can be collected in the form of a roll.

The defect inspection may be performed using known defect inspection methods. Examples of defect inspection methods include inspection with automatic inspection equipment and visual inspection by a checker. Automatic inspection equipment includes a system to automatically inspect defects (also referred to as flaws) in the sheet product, which performs a process including applying light to the product, capturing the reflected-light image or the transmitted-light image through an imaging unit such as a line sensor or a two-dimensional TV camera, and detecting defects based on the captured image data. The image data are also captured through a polarizing filter placed for inspection in the optical path between the light source and the imaging unit. In general, the polarization axis (e.g., polarized light absorption axis) of the polarizing filter for inspection is placed so as to be orthogonal (crossed-Nicol) to the polarization axis (e.g., polarized light absorption axis) of the polarizing plate (the test object). In the crossed-Nicol configuration, no defect allows a full black image to be input from the imaging unit, while any defect portion is detected as being not black (observed as a bright spot). Therefore, if an appropriate threshold is determined, defects can be detected. In such bright spot detection, defects such as surface deposits and internal foreign matter are detected as bright spots. Besides the bright spot detection, a method including capturing the transmitted-light image of the object with CCD and analyzing the image to detect foreign matter is also applicable. In addition, a method including capturing the reflected-light image of the object with CCD and analyzing the image to detect foreign matter deposited on the surface is also applicable.

Example 1

A joined sheet product and an optical display unit were manufactured using the above joining method. The sheet product is a laminated structure composed of a surface protecting film (PET film), an acrylic pressure-sensitive adhesive layer, a polarizing plate, an acrylic pressure-sensitive adhesive layer, and a release film (a PET film having a silicone-treated surface to be laminated). The polarizing plate includes a stretched and dyed polyvinyl alcohol film polarizer and triacetylcellulose films provided on both sides of the polarizer with an adhesive interposed therebetween. The joining member used is an adhesive tape (Danpron Tape No. 3041 manufactured by Nitto Denko Corporation). The adhesive tape has a width of 10 cm, a thickness of 70 μm, an adhesive strength of 7 N/25 mm, a tensile strength of 120 N/25 mm, and an elongation percentage of 140%. Various test methods are the same as those described above. As shown in FIG. 2, the sheet products were joined to each other with the adhesive tapes to form a joint portion. As a result, the two sheet products were successfully joined without breaking at the joint portion, and the release films were smoothly and successfully peeled off without interference with the other constituent members. The sheet product was successfully bonded to a liquid crystal cell substrate. In addition, the adhering force (A) between one of the adhesive tapes (Danpron Tape No. 3041) and the release film (a PET film with a silicone-treated surface to be laminated) of the second sheet product toward which the release film was peeled off was 3.5 N/25 mm. The adhering force (B) between the release film of the second sheet product and the acrylic pressure-sensitive adhesive layer was 0.02 N/25 mm. The adhering force (C) between the other adhesive tape (Danpron Tape No. 3041) and the exposed portion (the triacetylcellulose film of the polarizing plate) of the second sheet product was 3.8 N/25 mm. Therefore, the relation $C \geqq A > B$ (formula 1) was satisfied.

Optical Member

Examples of the polarizer and films generally include the materials described below, although some examples are described above with respect to the polarizer as a component of the optical member and films used on one or both sides of the polarizer.

Polarizer

The processes of dyeing, crosslinking and stretching a polyvinyl alcohol film are not necessarily independently performed and may be performed at the same time or in any order. The polyvinyl alcohol film may be subjected to a swelling process before use. The process may generally include the steps of immersing the polyvinyl alcohol film in a solution containing iodine or a dichroic dye so that the film is dyed with the iodine or the dichroic dye being adsorbed thereto, then washing the film, uniaxially stretching the film to 3 to 7 times in a solution containing boric acid, borax or the like, and then drying the film. It is particularly preferred that the step of stretching the film in a solution containing iodine or a dichroic dye should be followed by the steps of further stretching the film in a solution containing boric acid, borax or the like (two-stage stretching) and then drying the film, so that the iodine can be highly oriented to provide good polarizing properties.

For example, the polyvinyl alcohol polymer may be a polymer produced by polymerizing vinyl acetate and then saponifying the polymer or a copolymer produced by copolymerizing vinyl acetate with a small amount of a copolymerizable monomer such as an unsaturated carboxylic acid, an unsaturated sulfonic acid, or a cationic monomer. The average polymerization degree of the polyvinyl alcohol polymer is preferably, but not limited to, 1,000 or more, more preferably from 2,000 to 5,000. The saponification degree of the polyvinyl alcohol polymer is preferably 85% by mole or more, more preferably from 98 to 100% by mole.

The thickness of the produced polarizer is generally, but not limited to, from 5 to 80 µm. The thickness of the polarizer may be controlled by any conventional method such as tentering, roll stretching, or rolling.

As a non-limiting example, the polarizer and a polarizer-protecting transparent film serving as a protective layer may be bonded to each other with an adhesive such as an adhesive including a vinyl alcohol polymer or an adhesive including a vinyl alcohol polymer and a water-soluble crosslinking agent therefor such as boric acid, borax, glutaraldehyde, melamine, or oxalic acid. The adhesive layer may be formed by applying and drying an aqueous solution layer. In the process of preparing the aqueous solution, if necessary, any other additive or a catalyst such as an acid may also be added.

Polarizer Protecting Film

Any appropriate transparent film may be used as the polarizer protecting film to be placed one or both sides of the polarizer. For example, thermoplastic reins with a high level of transparency, mechanical strength, thermal stability, water-blocking performance, isotropy, or the like may be used. Examples of such thermoplastic resins include cellulose resins such as triacetylcellulose, polyester resins, polyethersulfone resins, polysulfone resins, polycarbonate resins, polyamide resins, polyimide resins, polyolefin resins, (meth)acrylic resins, cyclic polyolefin resins (norbornene resins), polyarylate resins, polystyrene resins, polyvinyl alcohol resins, and any blend thereof. While a transparent protective film may be bonded to one side of the polarizer with an adhesive layer, a thermosetting resin or an ultraviolet-curable resin such as a (meth)acrylic, urethane, acrylic urethane, epoxy, or silicone resin may be used to form a transparent protective film on the other side of the polarizer. The transparent protective film may contain any one or more appropriate additives. Examples of such an additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, even more preferably from 60 to 98% by weight, in particular, preferably from 70 to 97% by weight. If the content of the thermoplastic resin in the transparent protective film is less than 50% by weight, high transparency and other properties inherent in the thermoplastic resin may be insufficiently exhibited. Amorphous PO films, cycloolefin polymer (COP) films, Arton films (manufactured by JSR Corporation), Zeonor films (manufactured by Zeon Corporation), and so on may also be used.

The polymer film described in JP-A No. 2001-343529 (WO01/37007) may also be used, for example, which comprises a resin composition containing (A) a thermoplastic resin having a substituted and/or unsubstituted imide group in the side chain and (B) a thermoplastic resin having a substituted and/or unsubstituted phenyl and nitrile groups in the side chain. Specifically, the film comprises a resin composition containing an alternating copolymer of isobutylene and N-methylmaleimide and an acrylonitrile-styrene copolymer. The film may be produced by mixing-extrusion of the resin composition. These films have a low level of retardation and photoelastic coefficient and thus can prevent polarizing plates from having defects such as strain-induced unevenness. They also have low water-vapor permeability and thus have high humidity resistance.

The thickness of the transparent protective film is generally from about 1 to about 500 µm, in particular, preferably from 1 to 300 µm, more preferably from 5 to 200 µm, in view of strength, workability such as handleability, thin layer formability, or the like, while it may be determined as needed. A transparent protective film with a thickness of 5 to 150 µm is particularly preferred.

For practical use, the optical film may also have a multilayered structure in which various optical layers are laminated. Examples of such optical layers include, but are not limited to, layers formed by performing hard coating treatment, antireflection treatment, or surface treatment for anti-sticking, diffusion or antiglare purpose on the transparent protective film surface to which no polarizer will be bonded (the surface on which the adhesive coating layer is not provided), and oriented liquid crystal layers for viewing angle compensation or other purposes. An optical film(s) for use in forming a liquid crystal display or the like, such as a reflector, a transflector, a retardation plate (including a wavelength plate (λ plate) such as a half or quarter wavelength plate), or a viewing angle compensation film may also be used in the form of a layer or a laminate of two or more layers.

Retardation Plate

An example of the optical film to be placed on the polarizer includes a retardation plate. Examples of the retardation plate include birefringent films produced by uniaxially or biaxially stretching polymer materials, oriented liquid crystal polymer films, and oriented liquid crystal polymer layers supported on films. The stretching process may be typically performed by roll stretching, long-gap stretching, tenter stretching, or tubular stretching. Uniaxial stretching is generally performed to a stretch ratio of about 1.1 to about 3. The thickness of the retardation plate is generally, but not limited to, from 10 to 200 µm, preferably from 20 to 100 µm.

Examples of the polymer materials include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, polyvinyl chloride, cellulose polymers, and various types of binary or ternary copolymers thereof, graft copolymers thereof, and any blend thereof. Any of these polymer materials may be formed into an oriented product (a stretched film) by stretching or the like.

Viewing Angle Compensation Film

Another example of the optical film to be placed on the polarizer includes a viewing angle compensation film. The viewing angle compensation film is for expanding the viewing angle so that images can be relatively clearly viewed even when the screen of a liquid crystal display is viewed from directions not perpendicular but somewhat oblique to the screen. Examples of such a viewing angle compensation retardation plate include a retardation film, an oriented film of a liquid crystal polymer or the like, and an oriented layer of a liquid crystal polymer or the like supported on a transparent substrate. General retardation plates are produced with a polymer film that is uniaxially stretched in the in-plane direction and has birefringence. On the other hand, retardation plates for use as the viewing angle compensation film are produced with a bi-directionally stretched film such as a polymer film that is biaxially stretched in the in-plane direction and has birefringence, a polymer film that is uniaxially stretched in the in-plane direction and also stretched in the thickness direction so that it has a controlled refractive index in the thickness direction and has birefringence, and an obliquely oriented film. Examples of the obliquely oriented film include a film produced by a process including bonding a heat-shrinkable film to a polymer film and stretching and/or shrinking the polymer film under the action of the heat-shrinkage force, and an obliquely-oriented liquid crystal polymer film. The raw material polymer for the retardation plate may be the same as the polymer described above for the retardation plate, and any appropriate polymer may be used depending on the purpose such as prevention of coloration caused by changes in viewing angle based on the retardation of a liquid crystal cell and expansion of the viewing angle at which good visibility is achieved.

In order to expand the viewing angle at which good visibility is achieved, an optical compensation retardation plate is preferably used, which includes a triacetylcellulose film and an optically-anisotropic layer of an oriented liquid crystal polymer, specifically an obliquely-oriented discotic liquid crystal polymer layer, supported on the film.

Brightness Enhancement Film

A laminate of a polarizing plate and a brightness enhancement film is generally placed on the back side of a liquid crystal cell, when used. The brightness enhancement film exhibits the property that when light is incident on it from a backlight of a liquid crystal display or the like or when natural light is reflected from the back side and incident on it, it reflects linearly polarized light with a specific polarization axis or reflects circularly polarized light in a specific direction and transmits the other part of the light. When light from a light source such as a backlight is incident on a laminate of a polarizing plate and a brightness enhancement film, transmitted light in a specific polarization state is produced, and light in the state other than the specific polarization sate is not transmitted but reflected. The light reflected from the surface of the brightness enhancement film may be reversed by a reflective layer or the like provided behind the brightness enhancement film and allowed to reenter the brightness enhancement film so that the light can be entirely or partially transmitted in the specific polarization state. In this case, the quantity of the light transmitted through the brightness enhancement film can be increased, and polarized light, which is less likely to be absorbed by the polarizer, can be supplied so that the brightness can be enhanced by increasing the quantity of the light available at a liquid crystal image display or the like.

Examples of the brightness enhancement film that may be used include a film having the property of transmitting linearly polarized light with a specific polarization axis and reflecting the other type of light, such as a dielectric multilayer thin film or a multilayer laminate of thin films different in refractive index anisotropy, and a film having the property of reflecting one of clockwise circularly polarized light and counterclockwise circularly polarized light and transmitting the other, such as an oriented cholesteric liquid crystal polymer film or an oriented cholesteric liquid crystal layer supported on a film substrate.

Pressure-Sensitive Adhesive

In an embodiment of the invention, the polarizing plate or the optical member is provided with a pressure-sensitive adhesive layer for bonding it to another component such as a liquid crystal cell. The pressure-sensitive adhesive layer may be formed of any appropriate pressure-sensitive adhesive such as an acrylic pressure-sensitive adhesive according to conventional techniques. The pressure-sensitive adhesive layer preferably has low moisture absorption coefficient and high heat resistance, in order to prevent moisture absorption-induced foaming or peeling, to prevent optical property degradation due to a thermal expansion difference or the like, to prevent warping of a liquid crystal cell, and to form an image display with high quality and high durability. The pressure-sensitive adhesive layer may also contain fine particles so as to have light diffusing properties. The pressure-sensitive adhesive layer may be provided as needed on a necessary surface. Concerning a polarizing plate comprising a polarizer and a polarizer protecting film layer, for example, a pressure-sensitive adhesive layer may be provided as needed on one or both sides of the polarizer protecting layer.

Release Film

The exposed surface of the pressure-sensitive adhesive layer may be temporarily covered with a release film (it may also called "separator") for antifouling or the like until it is put to use. This can prevent contact with the pressure-sensitive adhesive layer during usual handling. A conventional appropriate separator may be used, such as an appropriate thin leave including a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

Surface Protecting Member

A surface protecting member may be provided on the opposite side of the optical member from the side where the separator is provided. A surface protecting film may be formed as the surface protecting member through a weak pressure-sensitive adhesive. The main purpose thereof is anti-scratch, anti-fouling, or the like. For example, the surface protecting film may be a single layer of a plastic film or a laminate of plastic film layers. Examples of the surface protecting member include an appropriate thin leave such as a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

In an embodiment of the invention, an ultraviolet absorbing capability may be imparted to the polarizer, the polarizer protecting film, or any other film such as the surface protecting film or the release film, or each layer such as the pressure-sensitive adhesive, for example, by treatment with an ultraviolet-absorbing agent such as a salicylate ester compound, a benzophenol compound, a benzotriazole compound, a cyanoacrylate compound, or a nickel complex salt compound.

Optical Image Display

In an embodiment of the invention, the optical member is preferably used to form an image display such as a liquid crystal display, an organic electroluminescence display (organic EL display) or a plasma display panel (PDP).

In an embodiment of the invention, the optical member is preferably used to form any of various devices such as liquid crystal displays. Liquid crystal displays may be formed according to conventional techniques. Specifically, a liquid crystal display may be typically formed by assembling a liquid crystal cell and optical films, and optional components such as a lighting system and by incorporating a driving circuit according to conventional techniques, except that the optical film is used according to the invention. Any type of liquid crystal cell such as TN type, STN type or n type may be used.

The invention claimed is:

1. A method for manufacturing an optical display unit, comprising:
   a cutting step comprising cutting a joined sheet product with exception of a release film which forms a part of the joined sheet product into a piece with a predetermined size by cutting means; and
   a bonding step comprising bonding the piece with the predetermined size to a substrate with a pressure-sensitive adhesive interposed therebetween while removing the release film;
   wherein the joint sheet product is manufactured by a method for manufacturing a joined sheet product comprising sheet products that are joined to each other and each comprise at least an optical member, a surface protecting member provided on one side of the optical member, and a release film provided on another side of the optical member with the pressure-sensitive adhesive interposed therebetween, comprising:
   a first joining step comprising opposing a transverse end face of a first sheet product to a transverse end face of a second sheet product and joining release films of the first and second sheet products with a first joining member;
   a removing step comprising removing a portion of an intended member including at least a surface protecting member so as to leave at least the release film and the pressure-sensitive adhesive provided on the release film among the constituent members of both or any one of the first and second sheet products, wherein the portion has a predetermined length from a transverse end face of the intended member;
   wherein the intended member includes a predetermined length portion of the first sheet product or a predetermined length portion of the second sheet product, toward which the release film will be peeled off from the joined sheet product in a longitudinal direction of the joined sheet product; and
   a second joining step comprising providing a second joining member on at least an exposed portion resulting from the removal of the intended member to join the surface protecting member sides of the first and second sheet products.

2. A method for manufacturing optical display unit, comprising:
   a cutting step comprising cutting a joined sheet product with exception of a release film which forms a part of the joined sheet product into a piece with a predetermined size by cutting means; and
   a bonding step comprising bonding the piece with the predetermined size to a substrate with a pressure-sensitive adhesive interposed therebetween while removing the release film;
   wherein the joined sheet product comprising:
   first and second sheet products that are joined to each other and each comprise at least an optical member, a surface protecting member provided on one side of the optical member, and a release film provided on another side of the optical member with the pressure-sensitive adhesive interposed therebetween;
   a joint portion in which a transverse end face of the first sheet product and a transverse end face of the second sheet product are opposed and joined to each other;
   a first joining member provided on the release films of the first and second sheet products in the joint portion;
   an exposed portion formed by removing a portion of an intended member including at least the surface protecting member but not including the release film and the pressure-sensitive adhesive provided on the release film in the joint portion of both or any one of the first and second sheet products, wherein the portion of the intended member has a predetermined length from a transverse end face of the intended member;
   wherein the intended member includes a predetermined length portion of the first sheet product or a predetermined length portion of the second sheet product, toward which the release film will be peeled off from the joined sheet product in a longitudinal direction of the joined sheet product; and
   a second joining member that is provided on the exposed portion and the surface protecting member side of both or any one of the first and second sheet products in the joint portion.

* * * * *